(12) United States Patent
Ajimoto

(10) Patent No.: US 9,429,229 B2
(45) Date of Patent: Aug. 30, 2016

(54) SHIFT CONTROL DEVICE FOR CONTINUOUSLY VARIABLE TRANSMISSION

(71) Applicant: Fuji Jukogyo Kabushiki Kaisha, Tokyo (JP)

(72) Inventor: Keisuke Ajimoto, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/592,772

(22) Filed: Jan. 8, 2015

(65) Prior Publication Data

US 2015/0198240 A1 Jul. 16, 2015

(30) Foreign Application Priority Data

Jan. 15, 2014 (JP) ................................. 2014-005122

(51) Int. Cl.
*G06F 7/00* (2006.01)
*F16H 61/02* (2006.01)
*F16H 61/662* (2006.01)
*F16H 61/21* (2006.01)
*F16H 61/12* (2010.01)
*F16H 59/66* (2006.01)

(52) U.S. Cl.
CPC .......... *F16H 61/0213* (2013.01); *F16H 61/12* (2013.01); *F16H 61/21* (2013.01); *F16H 61/662* (2013.01); *F16H 61/66259* (2013.01); *F16H 2059/663* (2013.01); *F16H 2061/0227* (2013.01); *F16H 2061/0237* (2013.01); *F16H 2061/66209* (2013.01)

(58) Field of Classification Search
CPC ............... F16H 61/0213; F16H 61/21; F16H 61/66259; F16H 61/662; F16H 2061/66209; F16H 2061/0227; F16H 2061/0237
See application file for complete search history.

(56) References Cited

U.S. PATENT DOCUMENTS

| 5,317,937 | A | * | 6/1994 | Yoshizawa | .......... F16H 61/0213 477/120 |
| 5,813,942 | A | * | 9/1998 | Nakagawa | .......... F16H 61/0213 477/120 |
| 5,941,793 | A | * | 8/1999 | Ito | .................. F16H 61/0213 477/120 |
| 6,427,108 | B1 | * | 7/2002 | Kanasugi | ............. B60K 28/165 477/118 |
| 2003/0036839 | A1 | * | 2/2003 | Han | .......................... B60T 8/18 701/70 |
| 2004/0097328 | A1 | * | 5/2004 | Makiyama | ........ F16H 61/66259 477/43 |
| 2010/0318267 | A1 | * | 12/2010 | Murata | ............... F16H 61/0213 701/52 |
| 2011/0190992 | A1 | * | 8/2011 | Kleila | ..................... F16H 61/21 701/58 |
| 2011/0224878 | A1 | * | 9/2011 | Nakamura | ........ F16H 61/66259 701/56 |
| 2012/0310497 | A1 | * | 12/2012 | Haneda | ............... F16H 61/0213 701/52 |
| 2013/0151090 | A1 | * | 6/2013 | Chae | ......................... B60T 7/12 701/54 |
| 2013/0179044 | A1 | * | 7/2013 | Ishikawa | ............... B60W 10/11 701/53 |
| 2013/0297161 | A1 | * | 11/2013 | Gibson | ................. B60W 20/00 701/54 |

FOREIGN PATENT DOCUMENTS

JP 2003-083434 A 3/2003

* cited by examiner

*Primary Examiner* — David J Hlavka
(74) *Attorney, Agent, or Firm* — McGinn IP Law Group PLLC

(57) ABSTRACT

A shift control device for a continuously variable transmission includes a downhill control module that executes downhill control in which a gear ratio of the continuously variable transmission is corrected to a low side during driving downhill, and a gear ratio holding module that, in the case where a braking operation is detected while downhill control is executed, the gear ratio of the continuously variable transmission is held at the gear ratio at the time when the braking operation is started.

14 Claims, 4 Drawing Sheets

SHIFT CONTROL DEVICE FOR CONTINUOUSLY VARIABLE TRANSMISSION

CROSS-REFERENCE TO RELATED APPLICATIONS

The present application claims priority from Japanese Patent Application No. 2014-005122 filed on Jan. 15, 2014, the entire contents of which are hereby incorporated by reference.

BACKGROUND

1. Technical Field

The present invention relates to a shift control device for a continuously variable transmission installed in a vehicle.

2. Related Art

Continuously variable transmissions (CVTs), such as chain (or belt) type CVTs and toroidal type CVTs, which can steplessly change the gear ratio, have come into widespread use in recent years as automotive automatic transmissions. A chain type continuously variable transmission includes a primary pulley provided to an input shaft, a secondary pulley provided to an output shaft, and a chain serving as a drive transmission component, wound over the pulleys. The gear ratio is steplessly changed by changing the groove width of the pulleys, thereby continuously changing the diameter of the position where the drive transmission component rides.

The gear ratio of such continuously variable transmissions is controlled in accordance with parameters indicating the running state of the vehicle, such as accelerator position and vehicle speed, for example. This means that target turbine speed (or target engine speed, target primary pulley speed) are set based on these parameters, and the gear ratio is controlled such that the actual turbine speed converges on the target turbine engine speed.

Such continuously variable transmission sometimes has a downhill control function to correct the gear ratio of the continuously variable transmission to a low side (downshift direction) when driving downhill (see Japanese Unexamined Patent Application Publication (JP-A) No. 2003-83434, for example).

A control device of the continuously variable transmission described in JP-A No. 2003-83434 obtains a running resistance increase amount ΔR, with running resistance for the vehicle when running on a flat road as a reference. When the running resistance increase amount ΔR is a negative value, the controller determines that the vehicle is traveling downhill, and corrects the gear ratio to the low side (downshift direction). The running resistance increase amount ΔR is equivalent to the inclination resistance, and is calculated by subtracting air resistance, rolling resistance, and acceleration resistance from driving force of the driving wheels.

When the brake pedal is applied while driving downhill (during downhill control), the control device for a continuously variable transmission of JP-A No. 2003-83434 halts the downhill control, and the control state is held. Suppose, for example, that when downhill control is executed while driving downhill and the gear ratio is corrected to the low side (downshift direction), the brake pedal is depressed so that the downhill control is held, and then the grade of the road becomes less steep. In this case, the level of the held downhill control is excessive for the less steep downhill road. In such state, if the brake pedal continues to be depressed so that the vehicle speed drops, the gear ratio is shifted down to the low side with the engine speed being maintained as the vehicle speed decreases, whereafter the engine speed falls according to a low gear line in a gear characteristic property line diagram. Accordingly, the engine speed is maintained high, which may give the driver a feeling of wrongness.

SUMMARY OF THE INVENTION

The present invention has been made in light of the above-described problem, and accordingly it is an object thereof to provide a shift control device for a continuously variable transmission having a downhill control function to correct the gear ratio of the transmission a the low side when driving downhill, which can prevent giving the driver a feeling of wrongness when a braking operation is made during downhill control.

An aspect of the present invention provides a shift control device for a continuously variable transmission, including: a downhill control module that executes downhill control in which a gear ratio of the continuously variable transmission is corrected to a low side during downhill driving; a detector that detects a braking operation of a driver; and a gear ratio holding module that, in the case where the braking operation is detected by the detector while the downhill control module is executing downhill control, holds the gear ratio at the time when the braking operation is started.

The shift control device may further include a braking downshift control module that, in the case where the braking operation is detected, executes braking downshift control to change the gear ratio by downshifting in accordance with the gear ratio and deceleration. In the case where the braking downshift control is executed by the braking downshift control module, the gear ratio holding module may hold the gear ratio at the gear ratio at the time when the braking downshift control is ended.

The gear ratio holding module may hold the gear ratio by setting a restriction value as to a target gear ratio for the continuously variable transmission, the target gear ratio being set based on a running state of the vehicle.

The gear ratio holding module may hold the gear ratio by setting a restriction value as to target rotational speed of an input shaft side of the continuously variable transmission, the target rotational speed being set based on a running state of a vehicle equipped with the shift control device.

When holding the gear ratio, the gear ratio holding module may set the restriction value so as to hold the gear ratio within an achievable gear ratio range for the continuously variable transmission.

DETAILED DESCRIPTION

Figure 1:
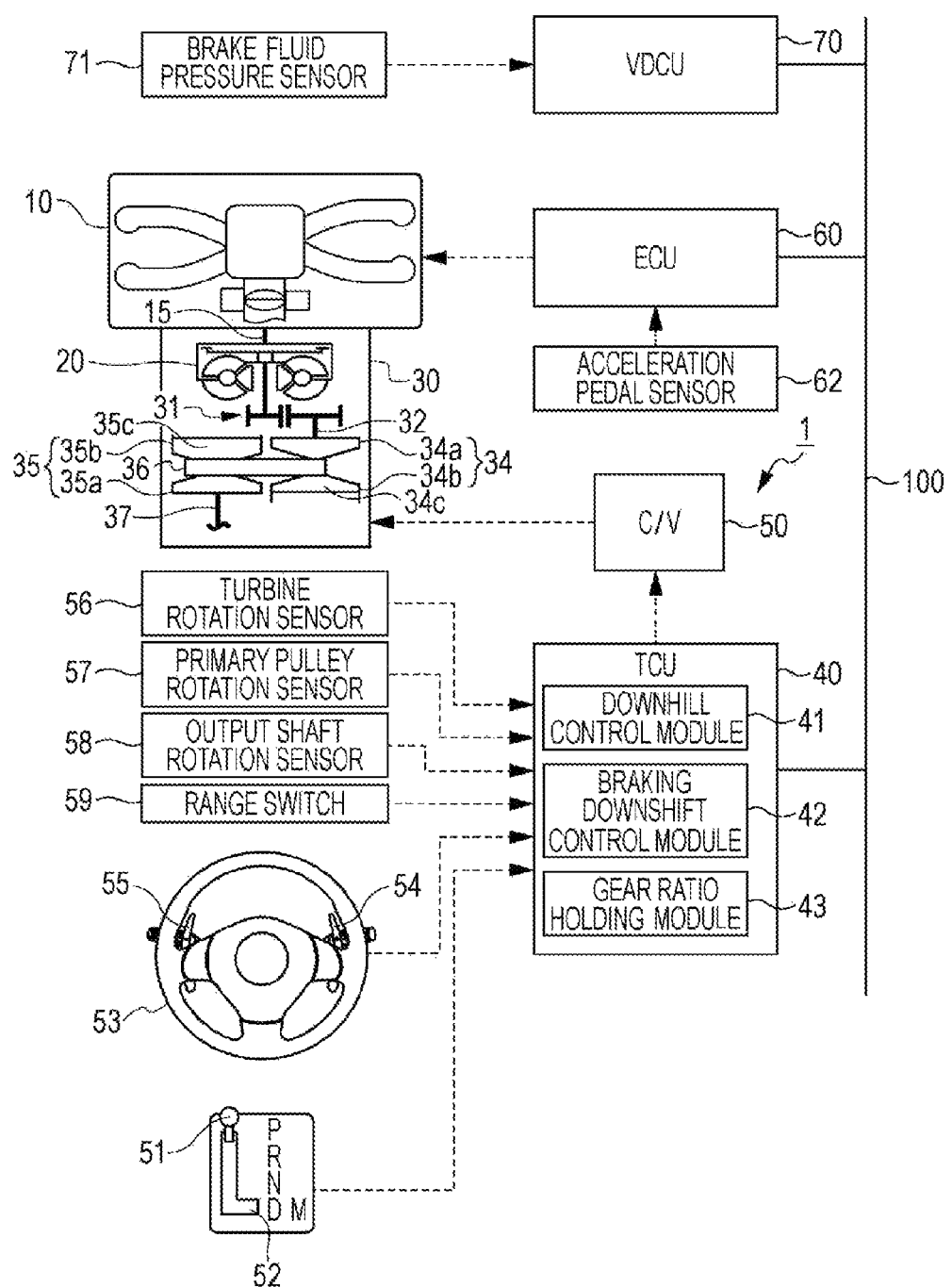
FIG. 1 is a block diagram illustrating the configuration of a shift control device for a continuously variable transmission according to an implementation, along with the configuration of the continuously variable transmission.

An implementation of the present invention will be described in detail with reference to the drawings. Components which are the same or equivalent in the drawings are denoted with the same reference numerals. The same components in the drawings are denoted with the same reference numerals, and redundant description thereof will be omitted.

First, the configuration of a shift control device 1 of a continuously variable transmission according to the implementation will be described with reference to FIG. 1. FIG. 1 is a block diagram illustrating the configuration of the shift control device 1 for a continuously variable transmission, and a continuously variable transmission 30 to which the shift control device 1 of the continuously variable transmission is applied.

The continuously variable transmission 30 is a continuously variable transmission which automatically and steplessly shifts the gear ratio in accordance with the running state of the vehicle equipped the continuously variable transmission 30. The continuously variable transmission 30 is connected to an output shaft 15 of an engine 10, and converts and outputs driving force from the engine 10.

The continuously variable transmission 30 includes a primary shaft 32 connected to an output shaft 15 of the engine 10 via a torque converter 20 having a clutch function and a torque amplifying function and a reduction gear 31, and a secondary shaft 37 disposed in parallel with the primary shaft 32.

The primary shaft 32 is provided with a primary pulley 34. The primary pulley 34 includes a fixed sheave 34*a* which is affixed to the primary shaft 32, and a movable sheave 34*b* which is faces the fixed sheave 34*a* and slidably movable in the axial direction of the primary shaft 32, so that the spacing between the conical faces of the sheaves 34*a* and 34*b*, i.e., the pulley groove width, can be changed. On the other hand, the secondary shaft 37 includes a secondary pulley 35. The secondary pulley 35 includes a fixed sheave 35*a* which is affixed to the secondary shaft 37, and a movable sheave 35*b* which is faces the fixed sheave 35*a* and slidably movable in the axial direction of the secondary shaft 37, so that the pulley groove width can be changed.

A chain 36 runs between the primary pulley 34 and the secondary pulley 35 to transmit driving force. The gear ratio is steplessly changed by changing the groove widths of the primary pulley 34 and the secondary pulley 35 and thus changing the ratio of the pitch radius of the chain 36 riding on the pulleys 34 and 35 (pulley ratio). The gear ratio i can be expressed by $$i=Rs/Rp$$

where Rp represents the pitch radius of the chain 36 as to the primary pulley 34, and Rs as to the secondary pulley 35.

A hydraulic chamber 34*c* is formed in the primary pulley 34 (movable sheave 34*b*), and a hydraulic chamber 35*c* is formed in the secondary pulley 35 (movable sheave 35*b*). The groove widths of the primary pulley 34 and secondary pulley 35 are set and changed by adjusting a primary oil pressure introduced to the hydraulic chamber 34*c* of the primary pulley 34 and a secondary oil pressure introduced to the hydraulic chamber 35*c* of the secondary pulley 35.

The oil pressures for changing the gear ratio of the continuously variable transmission 30, i.e., the aforementioned primary oil pressure and the secondary oil pressure are controlled by a valve body (control valve) 50. The valve body 50 adjusts the oil pressure of oil discharged from an oil pump by opening and closing an oil passage formed within the valve body 50, using a spool valve and a solenoid valve (electromagnetic valve) that moves the spool valve. Then, the valve body 50 provides the hydraulic chamber 34*c* of the primary pulley 34 and the hydraulic chamber 35*c* of the secondary pulley 35 with the oil pressure thus adjusted. The valve body 50 also supplies an oil pressure to a forward/reverse switching mechanism which switches the forward/reverse directions of the vehicle, and so forth.

The shift control of the continuously variable transmission 30 is executed by a transmission control unit (hereinafter also "TCU") 40. The TCU 40 controls the driving of the solenoid valve (electromagnetic valve) of the aforementioned valve body 50, thereby adjusting the oil pressures supplied to the hydraulic chamber 34*c* of the primary pulley 34 and the hydraulic chamber 35*c* of the secondary pulley 35 so as to change the gear ratio of the continuously variable transmission 30.

The TCU 40 is mutually communicably connected to an engine control unit (hereinafter also "ECU") 60 which centrally controls the engine 10, via a controller area network (CAN) 100, for example, a vehicle dynamic control unit (hereinafter also "VDCU") 70, and so forth.

Sensors are also connected to the ECU 60, such as an acceleration pedal sensor 62 that detects the position of the acceleration pedal, i.e., the amount by which the acceleration pedal has been depressed, a crank angle sensor that detects the rotational position of the crank shaft, an airflow meter that detects air intake amount, a coolant temperature sensor that detects the temperature of coolant for the engine 10, and an air-fuel ratio sensor.

The ECU 60 distinguishes cylinders based on the output of the cam angle sensor, and calculates the engine speed based on the output of the crank angle sensor. The ECU 60 further obtains various types of information from detection signals input from the various aforementioned sensors, such as air intake amount, accelerator pedal position, air-fuel ratio of the air-fuel mixture, and engine coolant temperature. On the basis of the various types of information obtained, the ECU 60 centrally controls the engine 10, by controlling the amount of fuel injection and spark timing, and controlling various devices such as an electronically controlled throttle valve. The TCU 40 receives information such as engine speed, acceleration pedal position, and so forth, from the ECU 60 via the CAN 100.

Sensors are also connected the VDCU 70, such as a brake fluid pressure sensor 71 that detects a master cylinder pressure (brake fluid pressure) of a brake actuator (omitted from illustration). The brake fluid pressure sensor 71 serves as the detector of the present invention in the implementation. While driving the brake actuator in accordance with the amount of operation of the brake pedal to control the vehicle, the VDCU 70 also detects the behavior of the vehicle by various types of sensors (e.g., wheel speed sensor, steering angle sensor, acceleration sensor, and yaw rate sensor), and performs brake control by automatically applying pressure, and by torque control of the engine 10 to suppress skidding, thereby securing stability of the vehicle when turning. The VDCU 70 transmits brake operation information, such as the detected master cylinder pressure (brake fluid pressure), to the TCU 40 via the CAN 100.

Sensors are connected to the TCU 40, such as an output shaft rotation sensor (vehicle speed sensor) 58 which is attached near the output shaft (secondary shaft 37) of the continuously variable transmission 30 and detects the rotational speed of the output shaft, and a primary pulley rotation sensor 57 which detects the rotational speed of the primary pulley 34.

A shift lever (select lever) 51 which accepts driver operations to switch to one or the other of an automatic shift mode ("D" range) and manual shift mode ("M" range) is provided on the floor or the like of the vehicle. A range switch 59 is connected with the shift lever 51 so as to operate in conjunction with the shift lever 51, to detect the selected position of the shift lever 51. The TCU 40 is connected to the range switch 59, and reads the selected position of the shift lever 51 detected by the range switch 59. The shift lever 51 is used to selectively switch between the "D" range and "M" range, as well as a parking "P" range, reverse "R" range, and neutral "N" range.

The shift lever 51 includes an M range switch 52. The M range switch 52 is turned on when the shift lever 51 is at the "M" range position, i.e., when the manual shift mode is selected where the gear ratio is switched by a user shift operation. The M range switch 52 is turned off when the shift lever 51 is at the "D" range, i.e., when the automatic shift mode is selected where the gear ratio is automatically change in accordance with the running state of the vehicle. The M range switch 52 is also connected to the TCU 40.

Behind a steering wheel 53 are provided a plus (+) paddle switch 54 and a minus (−) paddle switch 55 which accept driver gear shift operations (gear shift requests) when the manual shift mode has been selected. Hereinafter, the plus paddle switch 54 and the minus paddle switch 55 may be collectively referred to as "paddle switches 54 and 55". The plus paddle switch 54 is used for a manual shift-up, and the minus paddle switch 55 is used for a manual shift-down. The plus paddle switch 54 and the minus paddle switch 55 are connected to the TCU 40, and the TCU 40 reads switch signals, output from the paddle switches 54 and 55.

The TCU 40 includes a microprocessor which performs computations, read only memory (ROM) which stores programs and so forth with which the microprocessor executes the various processes, shift maps, and so forth, a random-access memory (RAM) which stores various types of data such as computation results and so forth, a backup RAM which holds the stored contents by way of a 12 V battery, an input/output interface, and so forth.

Figure 2:
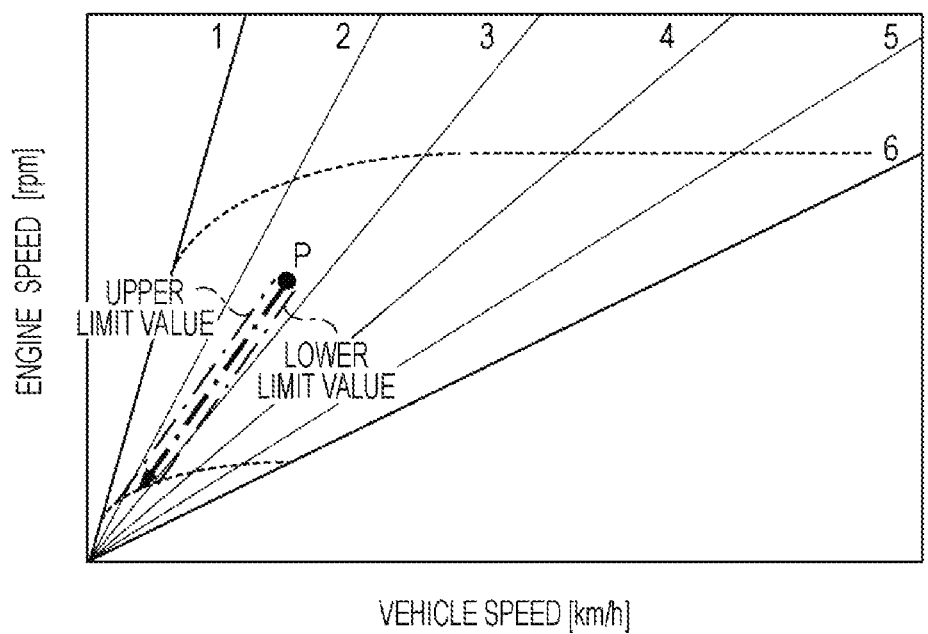
FIG. 2 is a diagram illustrating gear ratio settings of the continuously variable transmission according to the implementation.

When the automatic shift mode has been selected, the TCU 40 executes the stepless shift control mode in accordance with a gear shift map, whereby to the gear ratio is automatically and steplessly on the basis of the running state of the vehicle (e.g., throttle position, vehicle speed, etc.). The gear shift map corresponding to the automatic shift mode is stored in the ROM of the TCU 40. FIG. 2 is a gear characteristic property line diagram, illustrating the relation between engine speed and vehicle speed. The horizontal axis in FIG. 2 represents the vehicle speed (km/h), and the vertical axis represents the engine speed (rpm). The six solid lines each illustrate the relation between the engine speed and the vehicle speed when the gear ratio is kept constant at each step (i.e., gear ratio characteristic in the manual shift mode). In the automatic shift mode, any gear ratio from first speed (low) to sixth speed (overdrive) illustrated in FIG. 2 (the region indicated by the dashed line in FIG. 2) is automatically set in accordance with the vehicle running state. On the other hand, when the manual shift mode has been selected, the TCU 40 controls the gear ratio based on the shift operation accepted by the paddle switches 54 and 55.

The TCU 40 has a function to control the gear ratio so that the driver does not experience a feeling of wrongness when braking during downhill driving (while downhill control is being executed) in the automatic shift mode. To this end, the TCU 40 functionally includes a downhill control module 41, a braking downshift control module 42, and a gear ratio holding module 43. The TCU 40 achieves each of the functions of the downhill control module 41, braking downshift control module 42, and gear ratio holding module 43, by the microprocessor of the TCU 40 executing a program stored in the ROM.

The downhill control module 41 executes downhill control to correct the gear ratio to the low side (downshift side) during downhill driving. The downhill control module 41 estimates the grade resistance of the road based on driving force, and corrects the gear ratio to the low side (downshift direction) so as to cancel out the estimated grade resistance. While a braking operation is being performed, the downhill control module 41 halts the downhill control and holds the control state.

The braking downshift control module 42 executes braking downshift control. Specifically, when sudden deceleration due to a braking operation is detected, the gear ratio is automatically changed to a downshift state (e.g., to the low side by one step) in accordance with the gear ratio and the deceleration rate at the time of the detection to prepare for the next acceleration. That is to say, braking downshift control is performed not only during downhill control, as well as when driving through consecutive curves, which is also the case where sudden deceleration is detected due to braking.

When a braking operation is detected while downhill control is being performed by the downhill control module 41, the gear ratio holding module 43 holds the gear ratio of the continuously variable transmission 30 at the gear ratio of the time when the braking operation was started. Note however, that when the braking downshift control module 42 is executing braking downshift control, the gear ratio holding module 43 holds the gear ratio at the gear ratio of the time when the braking downshift control ends.

Restriction values (an upper limit guard value and lower limit guard value) may be set for the target gear ratio of the continuously variable transmission 30 set based on the operating state of the vehicle (accelerator position, vehicle speed, etc.), and the gear ratio holding module 43 may restrict (guard) the target gear ratio to within the restriction values (upper limit guard value and lower limit guard value) by performing upper limit processing and lower limit processing, thereby holding the gear ratio. Alternatively, only one restriction value (either one of the upper limit guard value and the lower limit guard value) may be set.

Restriction values (an upper limit guard value and lower limit guard value) may be set for the target turbine speed of the continuously variable transmission 30 that is set based on the operating state of the vehicle and corresponds to the target rotational speed of the input shaft of the present invention, and the gear ratio holding module 43 may restrict (guard) the target turbine speed to within the restriction values (upper limit guard value and lower limit guard value), thereby holding the gear ratio. The target engine speed or target primary pulley rotational speed may be used instead of the target turbine speed. The restriction values (upper limit guard value and lower limit guard value) are set so that the gear ratio holding module 43 holds the gear ratio within an achievable gear ratio range for the continuously variable transmission 30.

Figure 3:
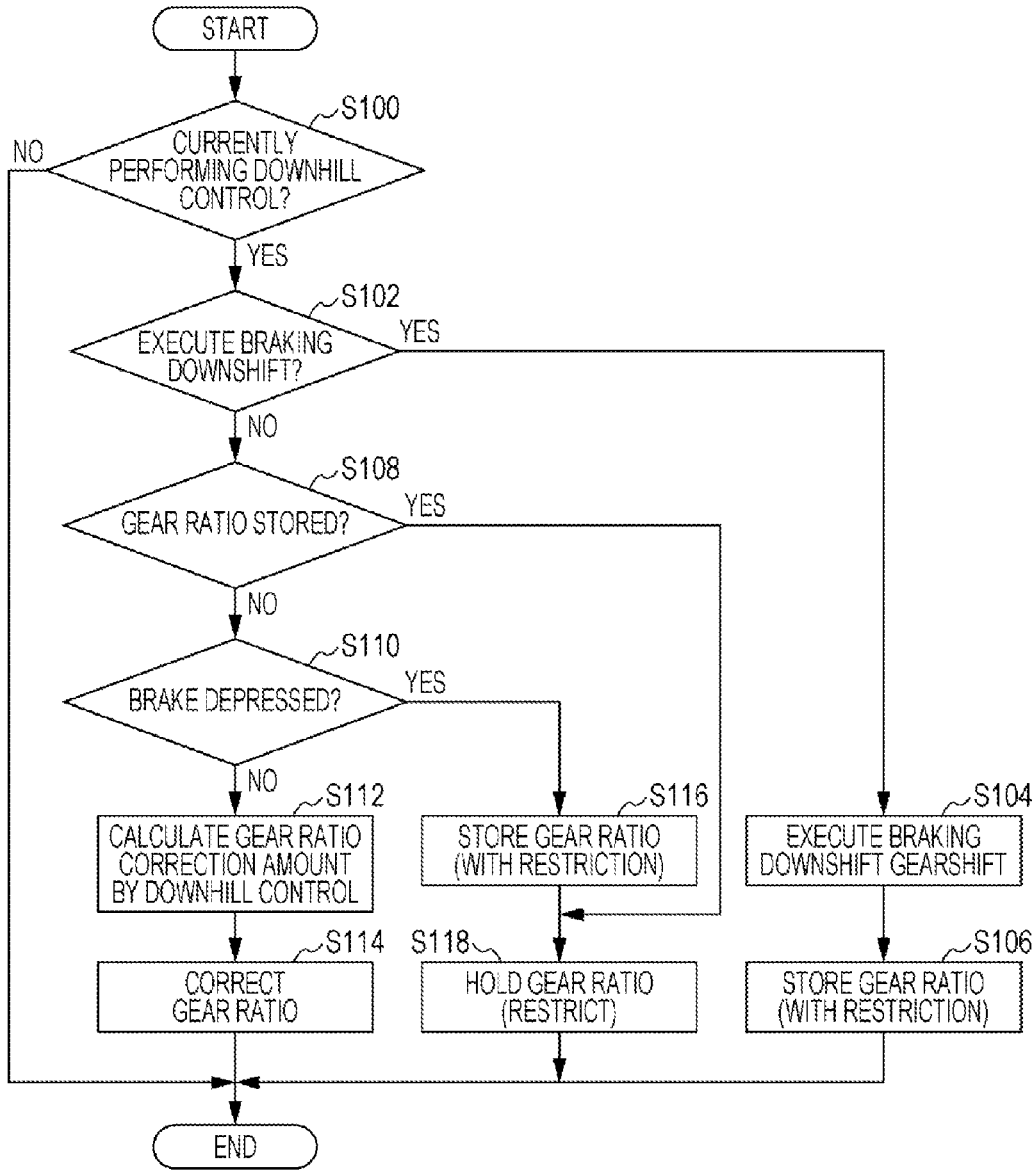
FIG. 3 is a flowchart illustrating gear shift control processing procedures of the shift control device of the continuously variable transmission according to the implementation, when driving downhill.

Next, operations of the shift control device 1 of the continuously variable transmission will be described with reference to FIG. 3. FIG. 3 is a flowchart illustrating shift control processing procedures by the shift control device 1 of the continuously variable transmission during downhill driving. This processing is repeated by the TCU 40 every predetermined time interval (e.g., 10 ms).

In step S100, determination is made regarding whether or not downhill control, where the gear ratio of the continuously variable transmission 30 is corrected to the low side (downshift direction) during downhill driving, is being performed. If downhill control is not being performed here, the flow ends. On the other hand, if downhill control is performed, the flow advances to step S102.

In step S102, determination is made regarding whether or not execution conditions for braking downshift control have been satisfied, i.e., whether or not sudden deceleration due to a braking operation has been detected. If conditions to execute braking downshift control have been satisfied, the flow advances to step S104. On the other hand, if conditions to execute braking downshift control have not been satisfied, the flow advances to step S108.

In step S104, braking downshift control is executed. Specifically, the gear ratio is downshifted (changed to the low side) in accordance with the gear ratio and the deceleration rate. The gear ratio at the end of the downshifting is stored in the subsequent step S106, and then the flow ends.

On the other hand, determination is made in step S108 regarding whether or not the gear ratio is stored. If the gear ratio is already stored, the flow advances to step S118. If the gear ratio is not stored yet, the flow advances to step S110.

In step S110, determination is made regarding whether or not the brake pedal is depressed, based on the brake fluid pressure, for example. If the brake pedal has not been depressed, the flow advances to step S112. If the brake pedal has been depressed, the flow advances to step S116.

In step S112, downhill control is executed, and a gear ratio correction amount is calculated for correcting the gear ratio of the continuously variable transmission 30 to the low side. In the following step S114, the gear ratio is corrected to the low side, based on the gear ratio correction amount calculated in step S112. The flow then ends.

If determination is made in step S110 that the brake pedal has been depressed, in step S116 the gear ratio at the time where the brake pedal was depress is stored. The flow then advances to step S118.

If determination is made in step S108 that the gear ratio has been stored, and if determination is made in step S116 that the gear ratio has been stored, in step S118 the gear ratio of the continuously variable transmission 30 is held at the stored gear ratio (i.e., the gear ratio at the time of braking or at the end of braking downshift). More specifically, a target gear ratio (or target turbine speed or the like determined from the target gear ratio) is set so as to be between the upper limit guard value and lower limit guard value (alternatively, below upper limit guard value or above the lower limit guard value), and the gear ratio is controlled so that the target gear ratio and the actual gear ratio agree. Thus, the gear ratio of the continuously variable transmission 30 is held at the stored gear ratio. Note that the upper limit guard value and lower limit guard value are each set so as to maintain the gear ratio within an achievable gear ratio range for the continuously variable transmission 30.

Figure 4:
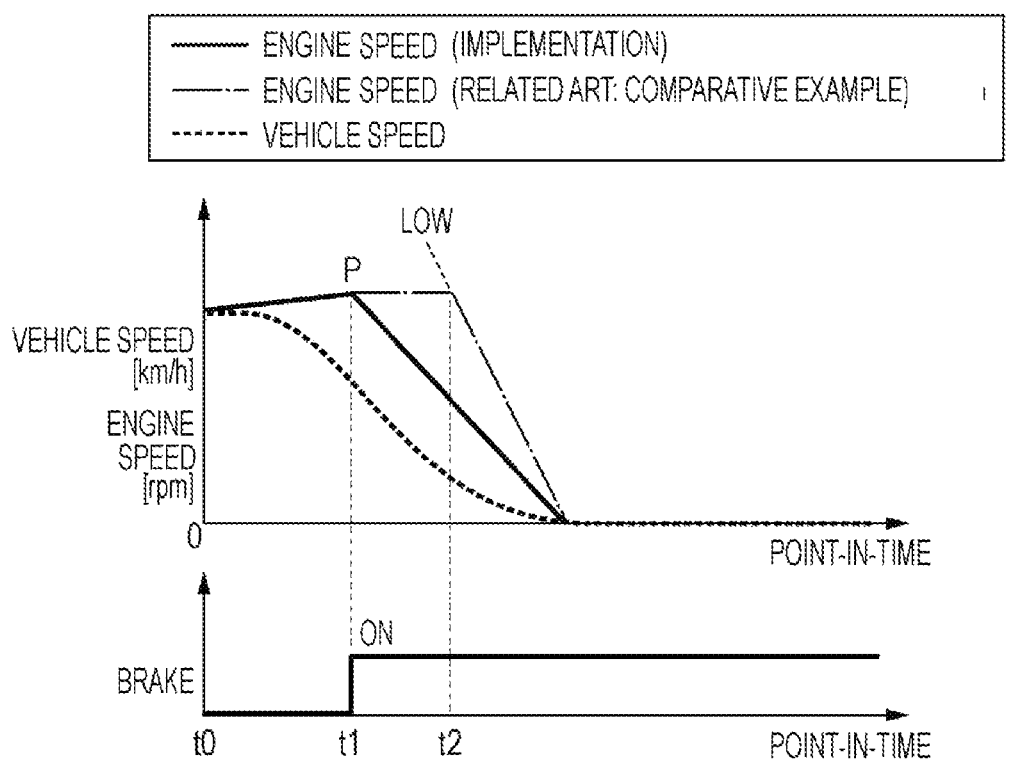
FIG. 4 is a timing chart illustrating an example of change in engine speed and vehicle speed when driving downhill.

An example of the change in engine speed and the vehicle speed when the processing of the above-described flowchart is executed is illustrated in the timing chart in FIG. 4. The horizontal axis in FIG. 4 represents points in time, and the vertical axis represents engine speed in rpm, indicated by the solid line, and vehicle speed in km/h, indicated by the dashed line. As a comparative example, FIG. 4 also illustrates the change in engine speed according to a conventional case where shift ratio is not held, indicated by the single-dot dashed line.

When the vehicle starts downhill driving at point-in-time t0, downhill control is started, and the gear ratio is corrected to the low side (downshift direction) according to the grade resistance, whereby engine speed rises. Accordingly, the engine braking effect is increased. When the brake pedal is depressed at point-in-time t1 while downhill control is being performed, the gear ratio of the continuously variable transmission 30 is maintained at the gear ratio at the time of the brake pedal being depressed (the single-dot dashed line in FIG. 2) during the period while the brake pedal is depressed. Thereafter, as the vehicle speed drops due to the brake pedal continuing to be applied, the engine speed drops along with the drop in vehicle speed. That is to say, engine speed is prevented from being maintained at an unnecessarily high state.

On the other hand, in conventional shift control where the gear ratio is not held, if the brake pedal is depressed (point-in-time t1) when downhill control is performed during driving downhill and the gear ratio is corrected to the low side (downshift side), the downhill control is halted and placed in a held state. Thereafter, as the vehicle speed drops due to the brake pedal continuing to be applied, the gear ratio is returned to the low side with the engine speed being maintained (point-in-time t2) as the vehicle speed drops, and then the engine speed falls according to a low gear line in the gear characteristic property line diagram (point-in-time t2 and thereafter). As a result, engine speed is maintained high for a longer time as compared to the implementation.

According to the implementation described in detail above, when a braking operation is performed while downhill control is being executed in which the gear ratio is corrected to the low side (downshift direction) during driving downhill, the gear ratio of the continuously variable transmission 30 is held at the gear ratio at the start of the braking operation. Accordingly, the engine speed falls as the vehicle speed falls, and engine speed is prevented from being maintained at a high state. Thus, the driver can be prevented from experiencing a feeling of wrongness when a braking operation is performed during driving downhill (during the execution of downhill control).

When, for example, the brake pedal is depressed immediately after starting downhill driving, correction of the gear ratio by downhill control may be halted in an insufficient state and the brake pedal may be further depressed. However, according to the implementation, when braking downshift control is executed, the gear ratio is held at the gear ratio of the time when the braking downshift ended. Accordingly, both braking downshift control and holding of the gear ratio can be realized, and thus control which meets the user intention can be performed.

According to the implementation, when there has been a braking operation, the restriction values (upper limit guard value and lower limit guard value) are set for the target gear ratio of the continuously variable transmission 30. The target gear ratio of the continuously variable transmission 30 is thus restricted (guarded) to within the restriction values (upper limit guard value and lower limit guard value), so the gear ratio can be held appropriately.

According to the implementation, restriction values (upper limit guard value and lower limit guard value) may be set for target turbine speed (alternatively, target engine speed, or target primary pulley rotational speed) instead of the target gear ratio, so that the target turbine speed is restricted (guarded) to within the restriction values (upper limit guard value and lower limit guard value). The gear ratio can be held appropriately also in such alternative cases.

According to the implementation, when the gear ratio is held, the restriction values (upper limit guard value and lower limit guard value) are set so that the gear ratio is held within an achievable gear ratio range for the continuously variable transmission 30. This enables the held gear ratio to be restricted to within an achievable gear ratio range for the continuously variable transmission 30.

The present invention is not restricted to the above implementation, and various modifications may be made. For example, while the present invention has been applied to a chain type continuously variable transmission (CVT) in the above implementation, the present invention may be applied to a belt type continuously variable transmission or a toroidal continuously variable transmission as well, for example.

Also, while the above implementation detects uses brake fluid pressure values received from the VDCU 70 via the CAN 100 to detect whether or not a brake operation has been performed, a signal of a brake switch which turns on when the brake pedal is depressed, for example, may be used instead of or in addition to the brake fluid pressure.

While the ECU 60 that controls the engine 10 has been described in the above implementation as being separate hardware from the TCU 40 that controls the continuously variable transmission 30, an integrated hardware configuration may be used.

The invention claimed is:

1. A shift control device for a continuously variable transmission comprising:
    a control unit; and
    a detector that detects a braking operation of a driver,
    wherein the control unit includes:
        a downhill control module that executes downhill control in which a gear ratio of the continuously variable transmission is corrected to a low side during downhill driving;
    and
        a gear ratio holding module that, when the braking operation is detected by the detector while the downhill control module is executing downhill control, holds the gear ratio at the gear ratio of the time when the braking operation is started.

2. The shift control device for a continuously variable transmission according to claim 1, wherein the control unit further includes:
    a braking downshift control module that, when the braking operation is detected by the detector, executes braking downshift control to change the gear ratio by downshifting in accordance with the gear ratio and deceleration,
    wherein the gear ratio holding module, when the braking downshift control is executed by the braking downshift control module, holds the gear ratio at the gear ratio at the time when the braking downshift control is ended.

3. The shift control device for a continuously variable transmission according to claim 1, wherein the gear ratio holding module holds the gear ratio by setting a restriction value as to a target gear ratio for the continuously variable transmission, the target gear ratio being set based on the running state of a vehicle equipped with the shift control device.

4. The shift control device for a continuously variable transmission according to claim 2, wherein the gear ratio holding module holds the gear ratio by setting a restriction value as to a target gear ratio for the continuously variable transmission, the target gear ratio being set based on the running state of a vehicle equipped with the shift control device.

5. The shift control device for a continuously variable transmission according to claim 1, wherein the gear ratio holding module holds the gear ratio by setting a restriction value as to target rotational speed of an input shaft of the continuously variable transmission, the target rotational speed being set based on the running state of a vehicle equipped with the shift control device.

6. The shift control device for a continuously variable transmission according to claim 2, wherein the gear ratio holding module holds the gear ratio by setting a restriction value as to target rotational speed of an input shaft of the continuously variable transmission, the target rotational speed being set based on the running state of a vehicle equipped with the shift control device.

7. The shift control device for a continuously variable transmission according to claim 3, wherein, when holding the gear ratio, the gear ratio holding module sets the restriction value so as to hold the gear ratio within an achievable gear ratio range for the continuously variable transmission.

8. The shift control device for a continuously variable transmission according to claim 4, wherein, when holding the gear ratio, the gear ratio holding module sets the restriction value so as to hold the gear ratio within an achievable gear ratio range for the continuously variable transmission.

9. The shift control device for a continuously variable transmission according to claim 5, wherein, when holding the gear ratio, the gear ratio holding module sets the restriction value so as to hold the gear ratio within an achievable gear ratio range for the continuously variable transmission.

10. The shift control device for a continuously variable transmission according to claim 6, wherein, when holding the gear ratio, the gear ratio holding module sets the restriction value so as to hold the gear ratio within an achievable gear ratio range for the continuously variable transmission.

11. The shift control device for a continuously variable transmission according to claim 1, wherein the downhill control module further estimates a grade resistance of a road based on a driving force, and corrects the gear ratio to the low side so as to cancel out the estimated grade resistance.

12. The shift control device for a continuously variable transmission according to claim 1, wherein the downhill control module halts the downhill control and holds the control state while a braking operation is being performed.

13. The shift control device for a continuously variable transmission according to claim 1, wherein the control units includes:
    a vehicle dynamic control unit (VDCU);
    a transmission control unit (TCU); and a
    n engine control unit (ECU).

14. A shift control device for a continuously variable transmission comprising:
    a control unit; and
    a detector that detects a braking operation of a driver,
    wherein the control unit includes:
        a downhill control module that executes downhill control in which a gear ratio of the continuously variable transmission is corrected to a low side during downhill driving; and
        a gear ratio holding module that holds the gear ratio at the start of the braking operation detected by the detector during the downhill control.

* * * * *